US012762430B2

(12) United States Patent
Chen et al.

(10) Patent No.: US 12,762,430 B2
(45) Date of Patent: Oct. 13, 2026

(54) COMBINED COMMODITY MINING METHOD BASED ON KNOWLEDGE GRAPH RULE EMBEDDING

(71) Applicant: ZHEJIANG UNIVERSITY, Hangzhou (CN)

(72) Inventors: Huajun Chen, Hangzhou (CN); Wen Zhang, Hangzhou (CN); Jiaojian Kang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 1130 days.

(21) Appl. No.: 17/791,899

(22) PCT Filed: Dec. 3, 2021

(86) PCT No.: PCT/CN2021/135500
§ 371 (c)(1),
(2) Date: Jul. 10, 2022

(87) PCT Pub. No.: WO2022/135118
PCT Pub. Date: Jun. 30, 2022

(65) Prior Publication Data

US 2023/0041927 A1 Feb. 9, 2023

(30) Foreign Application Priority Data

Dec. 23, 2020 (CN) ......................... 202011538259.3

(51) Int. Cl.
*G06N 5/022* (2023.01)
*G06F 18/2132* (2023.01)
(Continued)

(52) U.S. Cl.
CPC ............. *G06N 5/022* (2013.01); *G06F 18/22* (2023.01); *G06N 3/045* (2023.01); *G06N 5/025* (2013.01);
(Continued)

(58) Field of Classification Search
CPC ........ G06N 5/022; G06N 3/045; G06N 5/025; G06N 5/027; G06N 3/084; G06N 3/048;
(Continued)

(56) References Cited

U.S. PATENT DOCUMENTS

2018/0174219 A1 6/2018 Jadhav et al.

FOREIGN PATENT DOCUMENTS

CN 109903117 6/2019
CN 110275964 9/2019
(Continued)

*Primary Examiner* — Alexey Shmatov
*Assistant Examiner* — Kyu Hyung Han
(74) *Attorney, Agent, or Firm* — Jiwen Chen; JOYWIN IP LAW PLLC

(57) ABSTRACT

The present invention is a combined commodity mining method based on knowledge graph rule embedding, comprising: expressing rules, commodities, attributes, and attribute values as embeddings; splicing and inputting the embeddings of the rules and the embeddings of the attributes into a first neural network to obtain a importance scores of the attributes; splicing and inputting the rules and attributes into a second neural network to obtain the embeddings of the attribute values that the rules should take under the attributes; calculating a similarity between the value of two inputted commodities under the attribute and the embedding of the attribute value calculated by a model; after calculating scores of all attribute-attribute value pairs, summing up to obtain scores of these two commodities under this rule; then making the cross entropy loss with the real scores of these two commodities, and iteratively training based on an optimization algorithm having gradient descent; after the model is trained, parsing the embeddings of the rules in a similar way to obtain rules that can be understood by human beings.

3 Claims, 1 Drawing Sheet

(51) Int. Cl.
*G06F 18/22* (2023.01)
*G06N 3/045* (2023.01)
*G06N 5/02* (2023.01)
*G06N 5/025* (2023.01)

(52) U.S. Cl.
CPC ....... *G06N 5/027* (2013.01); *G06F 18/21326* (2023.01)

(58) Field of Classification Search
CPC ........ G06N 3/042; G06N 3/047; G06F 18/22; G06F 18/21326; G06F 18/26; G06F 16/367; G06Q 30/0201
See application file for complete search history.

(56) References Cited

FOREIGN PATENT DOCUMENTS

| | | | | | |
|---|---|---|---|---|---|
| CN | 110490717 | A | * | 11/2019 | ......... G06Q 30/0631 |
| CN | 111179031 | A | * | 5/2020 | ......... G06Q 30/0631 |
| CN | 111222332 | | | 6/2020 | |
| CN | 111737481 | A | * | 10/2020 | ........... G06F 16/367 |

* cited by examiner

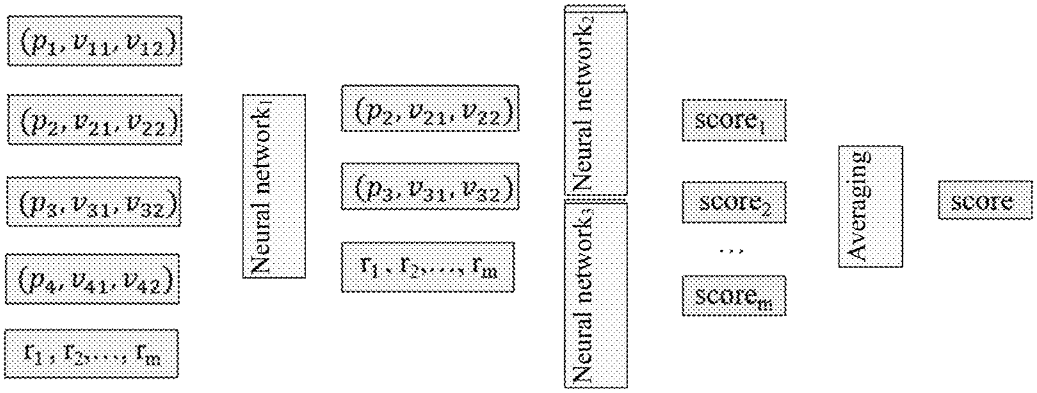
$(p_1, v_{11}, v_{12})$
$(p_2, v_{21}, v_{22})$
$(p_3, v_{31}, v_{32})$
$(p_4, v_{41}, v_{42})$
$r_1, r_2, \ldots, r_m$
Neural network$_1$
$(p_2, v_{21}, v_{22})$
$(p_3, v_{31}, v_{32})$
$r_1, r_2, \ldots, r_m$
Neural network$_2$
Neural network$_3$
score$_1$
score$_2$
...
score$_m$
Averaging
score

COMBINED COMMODITY MINING METHOD BASED ON KNOWLEDGE GRAPH RULE EMBEDDING

This is a U.S. national stage application of PCT Application No. PCT/CN2021/135500 under 35 U.S.C. 371, filed Dec. 3, 2021 in Chinese, claiming priority of Chinese Application No. 202011538259.3, filed Dec. 23, 2020, all of which are hereby incorporated by reference.

FIELD OF TECHNOLOGY

The present invention relates to the field of knowledge graph rules, in particular to a combined commodity mining method based on knowledge graph rule embedding.

BACKGROUND TECHNOLOGY

In knowledge graph, triples (head, relation, tail) are used to represent knowledge. We can represent this knowledge with one-hot vectors. But there are too many entities and relations, and the dimensions are too large. The one-hot vectors cannot capture similarities when two entities or relations are very close. Inspired by a Wrod2Vec model, many methods for representing entities and relations with distributed representations (KGE) have been proposed in academic community, such as TransE, TransH, TransR and so on. A basic idea of these models is that by learning a graph structure, the head, relation and tail can be represented by a low-dimensional dense vector. For example, the TransE is to make a sum of the head vector and the relation vector as close as possible to the tail vector. In the TransE, a triple is scored as:

$$f_r(h, t) = //h + r - t//_{L_1/L_2}$$

For a correct triple (h, r, t) EA, there should be a lower score, while for a wrong triple $$(h', r', t') \in \Delta',$$

there should be a higher score, and a final loss function is:

$$L = \sum_{(h,r,t)\in\Delta} \sum_{(h',r',t')\in\Delta'} \max(f_r(h, t) - f_r'(h', t') + \gamma, 0)$$

The knowledge graph only has the correct triplet (golden triplet), so a negative instance can be generated by destroying the head entity or tail entity of a correct triplet, that is, one of the head entity, tail entity, and relation is randomly replaced with other entity or relation, resulting in a set of negative instances $$\Delta'.$$

By continuously optimizing this loss function, the representations of h, r, t can be finally learned.

In the field of e-commerce, likewise, there is also a commodity knowledge graph. In the commodity knowledge graph, the head entity refers to a commodity, the relation refers to a commodity attribute, and the tail entity refers to an attribute value of the commodity. Therefore, embeddings of the commodity, commodity attribute and commodity attribute value can be learned through the KGE method, and then used in a downstream task.

In the field of the e-commerce, merchants sometimes need to bind and sell several commodities. On the one hand, a total price of the several commodities is generally lower than a sum of selling prices of all single commodities, so that profit is given to users and they would be more motivated to buy. On the other hand, a seller can make more profit by selling several commodities at the same time than by selling one commodity. Therefore, there is a great demand for combined commodity sales in practical applications, which requires a method that can automatically help sellers combine several commodities that can be sold together.

However, the KGE-based method has the disadvantage that although it can predict whether two commodities belong to a combination, the seller does not know why the two commodities are combined, so it is necessary to provide interpretability for this combination. Based on this, it is urgent to design a method so that the sellers can intuitively know why two commodities can be sold together.

SUMMARY OF THE INVENTION

The present invention provides a combined commodity mining method based on knowledge graph rule embeddings. By expressing the combined commodity rules as embeddings, and then parsing the learned rule embeddings into specific rules, it can help merchants to construct combined commodities that can be sold together.

A combined commodity mining method based on knowledge graph rule embeddings, comprising:

(1) constructing a knowledge graph of commodities, wherein for each ternary group data in the knowledge graph, a head entity is a commodity I, a relation is a commodity attribute P, a tail entity is a commodity attribute value V;

(2) expressing the commodity I, commodity attribute P, and commodity attribute value V as embeddings, respectively, and randomly initializing the embeddings of a plurality of rules;

(3) splicing and inputting the embedding of each rule and the embedding of each commodity attribute into a first neural network to obtain an importance score $s_1$ of the commodity attribute;

(4) splicing and inputting the embedding of each rule and the embedding of each commodity attribute into a second neural network to obtain the embedding of the attribute value that the rule should obtain under that attribute: $V_{pred}$;

(5) splicing and inputting the embedding of each rule and the embedding of each commodity attribute into a third neural network, and calculating a probability score p of the same attribute value of a certain attribute under a certain rule;

(6) if attribute values of two commodities under a certain attribute are different, calculating a similarity score $S_{21}$ of $V_{pred}$ and $V_1$, and a similarity score $S_{22}$ of $V_{pred}$ and $V_2$; and if the attribute values of two commodities under the certain attribute are the same, calculating a similarity score $S_2$ of the $V_{pred}$ and V true;

wherein, $V_1$ represents an embedding of an attribute value of one of the two commodities under the attribute, $V_2$ is an embedding of an attribute value of another commodity under the attribute, $V_{ture}$ is an embedding of the same attribute value;

(7) when an importance score $s_1$ of a certain attribute is greater than a threshold $thres_1$, and attribute values of the two commodities are the same under the certain attribute, summing up to obtain a $score_{ij}$ of this attribute-attribute value pair as $s_1 \times (p+(1-p) \times s_2)$; when the importance score $s_1$ of a certain attribute is greater than the $thres_1$, and the attribute values of the two commodities under the certain attribute are different, summing up to obtain the $score_{ij}$ of this attribute-attribute value pair as $0.5 \times s_1 \times (s_{21}+s_{22})$; when the importance score $s_1$ of a certain attribute is less than or equal to the $thres_1$, taking the score of this attribute-attribute value pair as 0;

(8) summing up the scores "$score_j$" of m attribute-attribute value pairs of a commodity pair to obtain $score_j$:

$$score_i = \sum_{j=1}^{m} score_{ij}$$

(9) summing up the scores "$score_i$" of the commodity pair under n rules, and obtaining a final score "score" of the commodity pair:

$$score = \left(\sum_{i=1}^{n} score_i\right)/n$$

(10) comparing the obtained score of the commodity pair with two labels 0 or 1 indicating whether belonging to a combined commodity to obtain a cross entropy loss; iteratively solving based on an optimization algorithm having gradient descent until a loss value converges and parameters of the three neural networks are trained, and obtaining the embeddings that have learned the rules at the same time; and

(11) for the embeddings that have learned the rules, utilizing the trained neural network for analysis to obtain the rules of commodity combination.

In step (1), the composition of each triple in the commodity knowledge graph is (I, P, V), which represents that the attribute value of the commodity I under the attribute P is V. Different commodities are associated with the same attribute or attribute value, thus forming the structure of the graph.

In step (2), the commodity I, the commodity attribute P, the commodity attribute value V and a plurality of rules are respectively numbered as ids, and then each id constitutes a one-hot vector, and then the one-hot vector is mapped into an embedding, which is continuously optimized with a model training process.

In steps (3) to (5), in the three neural networks, a calculation formula of an activation function of each layer of neurons is:

$$RELU(x) = max(0, x)$$

wherein the function of RELU judges the value of each element in this matrix in turn, and if the value of the element is greater than 0, then the value is kept, otherwise the value is set to be 0.

In the three neural networks, a calculation formula of each layer of each neural network is:

$$l_1 = RELU(W_1 concat(r_i, p_j))$$
$$l_2 = RELU(W_2 l_1 + b_1)$$
$$l_3 = RELU(W_3 l_2 + b_2)$$
$$\ldots$$
$$l_L = sigmoid(W_L l_{L-1} + b_{L-1})$$

wherein, $W_1$ $W_2$, . . . , $W_L$; $b_1$, . . . , $b_2$, . . . , $b_L$ are all parameters that need to be learned, $W_1$, $W_2$, $W_3$, . . . , $W_L$ are matrices having sizes $dim_{emb}$*$dim_1$, $dim_1$*$dim_2$, $dim_2$*$dim_3$, . . . , $dim_{L-1}$*$dim_L$ respectively and being random initialized; $b_1$, $b_2$, . . . , $b_L$ is a randomly initialized vector of size $dim_1$, $dim_2$, $dim_3$, . . . , $dim_L$, L is the number of layers of the neural network; a nonlinear activation function sigmoid $$(z) = \frac{1}{1+e^{-z}},$$

the output value is limited to (0, 1) interval.

In step (6), the similarity scores $s_{21}$, $s_{22}$ and $s_2$ are all calculated by cosine similarity, and the specific formulas are:

$$s_{21} = cos\_sim\_1 = \frac{V_{pred} V_1}{//V_{pred}// * //V_1//}$$
$$s_{22} = cos\_sim\_2 = \frac{V_{pred} V_2}{//V_{pred}// * //V_2//}$$
$$s_2 = cos\_sim = \frac{V_{pred} V_{true}}{//V_{pred}// * //V_{true}//}$$

In step (10), the cross entropy loss function is:

$$H(prob, y) = -\sum_i y(i)\log(prob(i))$$

wherein, prob(i) and y(i) are both probability distribution functions, $0 \le i < K$ and i are integers, $y(i) \in \{0, 1\}$ is a real probability distribution and $0 \le prob(i) \le 1$ is a probability distribution predicted by the model, $$\sum_i y(i) = 1, \sum_i prob(i) = 1,$$

and K refers to a total number of categories, herein, K is 2; this cross entropy function is used to measure a difference between two distributions, the larger the value calculated by this formula, the greater the difference between the two distributions.

Preferably, the optimization algorithm having gradient descent is SGD or Adam.

The specific process of step (11) is:

for the learned rule embedding and each commodity pair, splicing and inputting the rule embedding and the embedding of each attribute of the commodity pair into the first network to obtain the importance score of each attribute;

- if the score $s_1$ of the attribute is greater than the threshold $thres_1$, then including the attribute in this rule;
- if the attribute is comprised in this rule, and the attribute values of the two commodities under this attribute are the same, calculating a probability p of taking "same" under this attribute;
- if p is greater than the threshold $thres_2$, then taking the values under this attribute as the same; if p is less than or equal to the threshold $thres_2$, then calculating the similarity score $s_2$ of the two commodities under this attribute; if $s_2$ is greater than the threshold $thres_3$, then taking, by the rule, the attribute value shared by the two commodities under this attribute;
- if the attribute is comprised in this rule, and the attribute values of the two commodities under this attribute are not the same,
- then calculating the similarity scores $s_{11}$ and $s_{12}$, if both $s_{11}$ and $s_{12}$ are greater than the threshold $thres_3$, then taking, by the rule, the two attribute values of these two commodities under this attribute.

Compared with the prior art, the present disclosure has the following beneficial effects:

The present invention integrates the learning of the rules into the training process of the model, and finally parses the learned rule embeddings into rules. Based on the rules, the seller can know why the two commodities can be combined for sale, which can bring great benefits for e-commerce sales of commodities.

BRIEF DESCRIPTION OF THE DRAWINGS

FIG. 1 is a schematic flowchart of a combined commodity mining method based on knowledge graph rule embedding according to the present invention.

DETAILED DESCRIPTION OF THE EMBODIMENTS

The present invention will be further described in detail below with reference to the accompanying drawings and embodiments. It should be pointed out that the following embodiments are intended to facilitate the understanding of the present invention, but do not have any limiting effect on it.

As shown in FIG. 1, a combined commodity mining method based on knowledge graph rule embeddings, wherein the method comprises the following steps:

S01. constructing a knowledge graph of commodities, wherein for each ternary group, a head entity is a commodity, a relation is a commodity attribute, a tail entity is a commodity attribute value. A task of combining commodities is defined as: given two commodities in the commodity knowledge graph, and a plurality of attributes and attribute values of each commodity, it is necessary to determine whether the two commodities are a combined commodity. The innovation of the present invention is that rule learning is integrated into a model training process, so that a seller can be provided with interpretability through learned rules.

S02. expressing firstly each commodity, commodity attribute, commodity attribute value, and rule as an id, and then indexing each id to an embedding. For each sample, the inputted two commodities would have n attributes and attribute values, plus the inputted n rules, the present invention predicts whether the two commodities are a combined commodity based on this method.

S03. calculating firstly a score of each attribute. Firstly, splicing and inputting the embedding of each rule and the embedding of each commodity attribute into a first neural network to obtain a importance score $s_1$ of the attribute. A formula for each layer of the first neural network is:

$$l_{11} = RELU(W_{11} concat(r_i, p_j))$$

$$l_{12} = RELU(W_{12} l_{11} + b_{12})$$

$$l_{13} = RELU(W_{13} l_{12} + b_{22})$$

$$\cdots$$

$$s_1 = \text{sigmoid}(W_{1L} l_{1(L-1)} + b_{1(L-1)})$$

Specifically, by splicing and inputting the embedding of each rule and the embedding of the commodity attribute into a fully connected layer, more and more high-level semantics are obtained, and finally the importance score $s_1$ of the attribute under the rule can be predicted based on the high-level semantics, a larger value means that the attribute is more likely to be included in this rule. Pre-setting a threshold $thres_1$, when the value of $s_1$ is greater than $thres_1$, then the attribute is included in this rule.

S04. then calculating a score of each attribute value. Splicing and inputting the embedding of each rule and the embedding of each commodity attribute into a second neural network to obtain a predicted embedding of the attribute value. A formula for each layer of the second neural network is:

$$l_{21} = RELU(W_{21} concat(r_i, p_j))$$

$$l_{22} = RELU(W_{22} l_{21} + b_{22})$$

$$l_{23} = RELU(W_{23} l_{22} + b_{23})$$

$$\cdots$$

$$V_{pred} = W_{2L} l_{2(L-1)} + b_{2(L-1)})$$

Specifically, the rules and attributes can be inputted into a multi-layer neural network, and finally the embedding of the attribute value that should be taken under the attributes is predicted. Next, there are two cases. If the inputted attribute values under the attribute of the two commodities are the same, then a similarity between the attribute value and the predicted attribute value can be calculated. The higher the similarity degree, the higher the score of the attribute value. The method for calculating the similarity of the attribute value is as follows:

$$s_2 = \cos\_\text{sim} = \frac{V_{pred} V_{true}}{//V_{pred}// * //V_{true}//}$$

Meanwhile, there is a possibility that under this rule, the value under this attribute is "same". At this time, splicing and inputting the embedding of each rule and the embedding of each commodity attribute into a third neural network, so as to obtain a probability that the value under this attribute is "same". The formula of the third neural network is:

$$l_{31} = RELU(W_{31} concat(r_i, p_j))$$

$$l_{32} = RELU(W_{32} l_{31} + b_{31})$$

$$l_{33} = RELU(W_{33} l_{32} + b_{32})$$

$$\ldots$$

$$p = \text{sigmoid}(W_{3L} l_{3(L-1)} + b_{3(L-1)})$$

If the inputted attribute values under the attribute of the two commodities are different, then the degree of similarity between the two attribute values and the predicted attribute values can be calculated separately, and then the two similarity scores can be combined to finally obtain the score for the two attribute values. The method for calculating the similarity of the attribute values is as follows:

$$s_{21} = \text{cos\_sim\_1} = \frac{V_{pred} V_1}{//V_{pred}// * //V_1//}$$

$$s_{22} = \text{cos\_sim\_2} = \frac{V_{pred} V_2}{//V_{pred}// * //V_2//}$$

$$s_2 = 0.5 * (s_{21} + s_{22})$$

S05. next, solving a score of an attribute-attribute value pair. It can be divided into three cases: when the score $s_1$ of the attribute is less than or equal to the preset threshold $thres_1$, then the score of the attribute value under the attribute should be 0; if the score $s_1$ of the attribute is greater than the preset threshold $thres_1$ and the attribute values of the two commodities under this attribute are the same, then the score of this attribute-attribute value is $$s_1^*(p + (1 - p) * s_2)$$

if the score $s_1$ of the attribute is greater than the preset threshold $thres_1$ and the attribute values of the two commodities under this attribute are different, then the score of this attribute-attribute value is $$0.5 * p * (s_{21} + s_{22})$$

S06, after obtaining the score of an attribute-attribute pair, calculating a score of a commodity pair under a certain rule, wherein the calculation formula is:

$$\text{score}_i = \sum\nolimits_{j=1}^{m} \text{score}_{ij}$$

S07. after obtaining the score of a commodity pair under a certain rule, summing up the scores of the commodity pair under all the rules to obtain a final score of the commodity pair, wherein the calculation formula is:

$$\text{score} = \left(\sum\nolimits_{j=1}^{n} \text{score}_i\right)/n$$

S08. comparing the obtained score of the commodity pair with two labels 0 or 1 indicating whether belonging to a combined commodity to obtain a cross entropy loss;

$$H(p, q) = -\sum_x p(x)\log(q(x))$$

This loss function is then optimized with the an Adam optimizer.

S09. after the rules are learned, parsing the rules, wherein the way of parsing the rules is similar to that during the training. First, the embedding of the rule and the embedding of each possible attribute are spliced and inputted into the first network to obtain the importance score of each attribute, and if the score $s_1$ of the attribute is greater than the threshold $thres_1$, then this attribute is included in this rule. Then, if the attribute is included in this rule, the value under the rule should be calculated to be "same" or a specific value.

In this way, the combination commodity rules can be obtained. In the final application, there are mainly two ways:

The first way or method is as follows:

Given a commodity pair, and the respective attributes and attribute values of each commodity, inputting this information into the model, you can get the probability score that two commodities in this commodity pair can be combined into a combined commodity, if the score is greater than 0.5, it is considered that these two commodities is a combined commodity.

The second way or method is as follows:

Given a commodity pair, and respective attributes and attribute values of each commodity. For all the rules generated by the present invention, check one by one to see whether each attribute-attribute value pair conforms to the current rule, and all attribute-attribute value pairs conform to the current rule, then based on the current rule, it can be determined that the two commodities belong to a combined commodity. If none of the rules can determine that the two commodities belong to a combined commodity, then the two commodities do not constitute a combined commodity.

Next, a specific example is used to illustrate the construction process of the present invention.

First, as shown in Table 1, it is a sample of the model input, which contains two commodities, each commodity contains a plurality of attributes and attribute values, under each attribute, the attribute values of the two commodities may or may not be the same.

TABLE 1

| | Commodity 1 | Commodity 2 |
|---|---|---|
| Brand | Estee Lauder | Estee Lauder |
| Production Place | Jiangsu Province | Guangdong Province |
| Effects | Whitening | Moisturizing |
| Series | Whitening cream | Essence lotion |
| Whether being a combined commodity | | Yes |

First, representing all attributes and attribute values of the two commodities as embeddings. Then passing each attribute through the first neural network to obtain the importance score of the attribute; then inputting the attribute value to the second neural network to obtain the attribute value score. Then, summing up the attribute and attribute-value scores to obtain the attribute-attribute value pair score. Then, summing up the scores of all attribute-attribute value pairs to obtain the score of the two commodities belonging to the same commodity under this rule. Finally, summing up the scores of all the rules for these two commodities, and finally obtaining the score that these two commodities belong to the same commodity.

During the testing phase, the rules need to be parsed. As shown in Table 2, it is a rule parsed by the model based on the samples shown in Table 1.

TABLE 2

| Head | Body |
|---|---|
| Combination | (Effects, whitening, moisturizing) && (Brand, same) |

The way of parsing the rule is similar to that in the training process. It also determines which attributes the rule contains, and then determines which attribute values should be contained under each attribute, and finally the rule can be parsed.

The above-mentioned embodiments describe the technical solutions and beneficial effects of the present invention in detail. It should be understood that the above-mentioned embodiments are only specific embodiments of the present invention and are not intended to limit the present invention. Any modifications, additions and equivalent replacements made within the principle of the present invention shall be included within the protection scope of the present invention.

The invention claimed is:

1. A computer-implemented combined commodity mining method based on knowledge graph rule embeddings, comprising:

(1) constructing a knowledge graph of commodities, wherein for each ternary group data in the knowledge graph, a head entity is a commodity I, a relation is a commodity attribute P, a tail entity is a commodity attribute value V;

(2) expressing the commodity I, commodity attribute P, and commodity attribute value V as embeddings, respectively, and randomly initializing the embeddings of a plurality of rules;

(3) splicing and inputting the embedding of each rule and the embedding of each commodity attribute into a first neural network to obtain a importance scores $s_1$ of the commodity attribute;

(4) splicing and inputting the embedding of each rule and the embedding of each commodity attribute into a second neural network to obtain the embedding of the attribute value that the rule should obtain under that attribute; $V_{pred}$;

(5) splicing and inputting the embedding of each rule and the embedding of each commodity attribute into a third neural network, and calculating a probability score p of the same attribute value of a certain attribute under a certain rule;

(6) if attribute values of two commodities under a certain attribute are different, calculating a similarity score $S_{21}$ of $V_{pred}$ and $V_1$, and a similarity score $S_{22}$ of $V_{pred}$ and $V_2$; and if the attribute values of two commodities under the certain attribute are the same, calculating a similarity score $S_2$ of the $V_{pred}$ and $V_{true}$;

wherein, $V_1$ represents an embedding of an attribute value of one of the two commodities under the attribute, $V_2$ is an embedding of an attribute value of another commodity under the attribute, $V_{ture}$ is an embedding of the same attribute value;

(7) when an importance score $s_1$ of a certain attribute is greater than a threshold $thres_1$, and the attribute values of the two commodities are the same under the certain attribute, summing up to obtain a $score_{ij}$ of this attribute-attribute value pair as $s_1 \times (p+(1-p) \times s_2)$; when the importance score $s_1$ of a certain attribute is greater than the $thres_1$, and the attribute values of the two commodities under the certain attribute are different, summing up to obtain the $score_{ij}$ of this attribute-attribute value pair as $0.5 \times s_1 \times (s_{21}+s_{22})$; when the importance score $s_1$ of a certain attribute is less than or equal to the $thres_1$, taking the score of this attribute-attribute value pair as 0;

(8) summing up the scores "$score_{ij}$" of m attribute-attribute value pairs of a commodity pair to obtain $score_i$:

$$score_i = \sum_{j=1}^{m} score_{ij}$$

(9) summing up the scores "$score_i$" of the commodity pair under n rules, and obtaining a final score "score" of the commodity pair:

$$score = \left(\sum_{i=1}^{n} score_i\right)/n$$

(10) comparing the obtained score of the commodity pair with two labels 0 or 1 indicating whether belonging to a combined commodity to obtain a cross entropy loss; iteratively solving based on an optimization algorithm having gradient descent until a loss value converges and parameters of the three neural networks are trained, and obtaining the embeddings that have learned the rules at the same time; and

(11) for the embeddings that have learned the rules, utilizing the trained neural network for analysis to obtain the rules of commodity combination;

wherein, in step (2), the commodity I, the commodity attribute P, the commodity attribute value V and a plurality of rules are respectively numbered as ids, and then each of the ids constitutes a one-hot vector, and then the one-hot vector is mapped into an embedding, which is continuously optimized with a model training process;

wherein, in step (6), the similarity scores $s_{21}$, $s_{22}$ and $s_2$ are all calculated by cosine similarity, and the specific formulas are:

$$s_{21} = \text{cos\_sim\_1} = \frac{V_{pred} V_1}{\|V_{pred}\| * \|V_1\|};$$

$$s_{22} = \text{cos\_sim\_2} = \frac{V_{pred} V_2}{\|V_{pred}\| * \|V_2\|};$$

$$s_2 = \text{cos\_sim} = \frac{V_{pred} V_{true}}{\|V_{pred}\| * \|V_{true}\|};$$

wherein, in step (10), the cross entropy loss function is:

$$H(prob, y) = -\sum_i y(i)\log(prob(i))$$

wherein, prob(i) and y(i) are both probability distribution functions, $0 \le i < K$ and i are integers, $y(i) \in \{0, 1\}$ is a real probability distribution and $0 \le prob(i) \le 1$ is a probability distribution predicted by the model, $$\sum_i y(i) = 1, \sum_i prob(i) = 1,$$

and K refers to a total number of categories, herein, K is 2; this cross entropy function is used to measure a difference between two distributions, the larger the value calculated by this formula, the greater the difference between the two distributions;

wherein, in step (10), the optimization algorithm having the gradient descent is SGD or Adam; and wherein, the specific process of step (11) is:

for the learned rule embedding and each commodity pair, splicing and inputting the rule embedding and the embedding of each attribute of the commodity pair into the first network to obtain the importance score of each attribute;

if the importance score $s_1$ of the attribute is greater than the threshold $thres_1$, then including the attribute in this rule;

if the attribute is comprised in this rule, and the attribute values of the two commodities under this attribute are the same, calculating a probability p of taking "same" under this attribute; if p is greater than the threshold $thres_2$, then taking the values under this attribute as the same; if p is less than or equal to the threshold $thres_2$, then calculating the similarity score $s_2$ of the two commodities under this attribute; if $s_2$ is greater than the threshold $thres_3$, then taking, by the rule, the attribute value shared by the two commodities under this attribute;

if the attribute is comprised in this rule, and the attribute values of the two commodities under this attribute are not the same, then calculating the similarity scores $s_{11}$ and $s_{12}$, if both s11 and s12 are greater than the threshold $thres_3$, then taking, by the rule, the two attribute values of these two commodities under this attribute.

2. The computer-implemented combined commodity mining method based on knowledge graph rule embedding according to claim 1, wherein, in steps (3) to (5), in the three neural networks, a calculation formula of an activation function of each layer of neurons is:

$$RELU(x) = \max(0, x)$$

wherein the function of RELU judges the value of each element in this matrix in turn, and if the value of the element is greater than 0, then the value is kept, otherwise the value is set to be 0.

3. The computer-implemented combined commodity mining method based on knowledge graph rule embedding according to claim 1, wherein, in steps (3) to (5), in the three neural networks, a calculation formula of each layer of each neural network is:

$$l_1 = RELU(W_1 concat(r_i, p_j))$$
$$l_2 = RELU(W_2 l_1 + b_1)$$
$$l_3 = RELU(W_3 l_2 + b_2)$$
$$\ldots$$
$$l_L = sigmoid(W_L l_{L-1} + b_{L-1})$$

wherein, $W_1$ $W_2, \ldots, W_L$; $b_1$ $b_2, \ldots, b_L$ are all parameters that need to be learned, $W_1, W_2, W_3, \ldots, W_L$ are matrices having sizes $dim_{emb}$*$dim_1$, $dim_1$*$dim_2$, $dim_2$*$dim_3$, . . . , $dim_{L-1}$*$dim_L$ respectively and being random initialized; $b_1, b_2, \ldots, b_L$ is a randomly initialized vector of size $dim_1, dim_2, dim_3, \ldots, dim_L$, L is the number of layers of the neural network; a nonlinear activation function sigmoid $$(z) = \frac{1}{1+e^{-z}},$$

the output value is limited to (0, 1) interval.

* * * * *